United States Patent
Lin

(10) Patent No.: US 9,858,772 B2
(45) Date of Patent: Jan. 2, 2018

(54) LENS, LIGHT-EMITTING DEVICE HAVING THE LENS, AND VISUAL NOTIFICATION APPLIANCE

(71) Applicant: Siemens Schweiz AG, Zurich (CH)

(72) Inventor: Shao Chen Lin, Beijing (CN)

(73) Assignee: SIEMENS SCHWEIZ AG, Zurich (CH)

(*) Notice: Subject to any disclaimer, the term of this patent is extended or adjusted under 35 U.S.C. 154(b) by 0 days.

(21) Appl. No.: 15/280,574

(22) Filed: Sep. 29, 2016

(65) Prior Publication Data

US 2017/0092083 A1   Mar. 30, 2017

(51) Int. Cl.
| F21V 5/04 | (2006.01) |
| G08B 5/36 | (2006.01) |
| F21V 23/00 | (2015.01) |
| F21Y 115/10 | (2016.01) |
| F21W 111/00 | (2006.01) |
| G08B 17/00 | (2006.01) |

(52) U.S. Cl.
CPC .............. G08B 5/36 (2013.01); F21V 5/04 (2013.01); F21V 23/00 (2013.01); F21W 2111/00 (2013.01); F21Y 2115/10 (2016.08); G08B 17/00 (2013.01)

(58) Field of Classification Search
CPC ................................ F21V 5/046; F21V 5/048
USPC ................................................. 362/326–340
See application file for complete search history.

(56) References Cited

U.S. PATENT DOCUMENTS

| 2010/0328940 A1 | 12/2010 | Huang et al. ............. 362/235 |
| 2011/0019400 A1 | 1/2011 | Huang et al. ............. 362/235 |
| 2016/0035199 A1* | 2/2016 | Savage, Jr. ............. G08B 5/38 |
|  |  | 362/555 |

FOREIGN PATENT DOCUMENTS

| CN | 101936502 A | 1/2011 | ............ F21V 5/04 |
| CN | 101963322 A | 2/2011 | ............ F21V 5/04 |
| CN | 102434850 A | 5/2012 | ............ F21V 5/04 |
| EP | 2383509 A1 | 11/2011 | ............ F21V 5/04 |

OTHER PUBLICATIONS

Chinese Office Action, Application No. 201510643083.0, 6 pages, dated Dec. 23, 2015.

* cited by examiner

*Primary Examiner* — Kevin Kim
(74) *Attorney, Agent, or Firm* — Slayden Grubert Beard PLLC

(57) ABSTRACT

A lens, a light-emitting device having a lens, and a visual notification appliance are disclosed. The lens may be substantially in the shape of a cap, and may include a substantially flat bottom surface, and a substantially cross-shaped recess sunken into the bottom surface, the recess providing orthogonal cross-arms, the optical source being adapted to be disposed in a cavity formed by the recess and capable of aligning with a crossing center of the cross-arms, and the recess being arranged so that more light incident upon an internal surface of the recess is refracted to the directions of the cross-arms than to the directions between the cross-arms.

15 Claims, 10 Drawing Sheets

LENS, LIGHT-EMITTING DEVICE HAVING THE LENS, AND VISUAL NOTIFICATION APPLIANCE

CROSS-REFERENCE TO RELATED APPLICATIONS

This application claims priority to CN Application No. 201510643083.0 filed Sep. 30, 2015, the contents of which are hereby incorporated by reference in their entirety.

TECHNICAL FIELD

The present invention generally relates to an optical lens and a light-emitting device having the lens. The lens enables the incident light beam having divergent characteristics from an optical source to be emergent with a predetermined optical distribution. The optical lens and light-emitting device is especially suitable for visual alarm devices or visual notification appliances in the fire-fighting field.

BACKGROUND

Visual notification appliances are widely used in fire alarm systems, and are used for sending visible alarm indications, e.g., flashes, to the field staff in case of emergency. Generally, a visual notification appliance (e.g., a light alarm) is connected to a control panel via a field line or a wireless link. When an emergency situation (e.g., when fire occurs) has been detected, the control panel can trigger a light alarm via the field line, so that the light alarm emits an alarm light to warn the field staff to evacuate in time.

Usually, the light alarm can be mounted on a ceiling ("top-mounted" for short), or mounted on a wall ("wall-mounted" for short). FIGS. 1 and 2 respectively schematically show schematic diagrams of top-mounted and wall-mounted light alarms 100. As shown in FIG. 1, the light alarm 100 typically comprises a base 110, an optical source (not shown) arranged on the base, and a transparent cover 120 covering the optical source. The transparent cover 120 may also function partially as a lens. The light alarm 100 is generally considered to be as a whole, and has a base plane and an optical axis perpendicular to the base plane, the light emergent in the direction of the optical axis having the highest light intensity. In the example shown in FIG. 1, the light alarm 100 is mounted on a ceiling or a roof 64. Thus, the base plane of the light alarm 100 is parallel to the ceiling 64, i.e., as shown in FIG. 1, having an X direction and a Y direction perpendicular to each other. The optical axis is perpendicular to the base plane, and extends in the Z direction as shown in FIG. 1. FIG. 2 shows the case of the light alarm 100 mounted on a wall. In this case, the base plane of the light alarm 100 as shown in FIG. 2 is parallel to a mounting surface, i.e., a wall surface 66. The X direction and Y direction in the base plane are in a plane parallel to the wall surface 66, and the Z direction serving as an optical axis is perpendicular to the wall surface 66.

At present, the fire-protection standards of some nations propose different light intensity distribution requirements for top-mounting and wall-mounting respectively. FIGS. 3A and 3B schematically show two light intensity distribution requirements. Specifically, for top-mounting, emergent light from the light alarm 100 needs to satisfy the light intensity distribution curve as shown in FIG. 3A at least on the X-Z plane and the Y-Z plane as shown in FIG. 1. It can be seen from FIG. 3A that, both on the X-Z plane and on the Y-Z plane, the light intensity distribution needs to satisfy the requirement that a certain light intensity distribution can be achieved within a range of −90° to +90° of the included angle with respect to the Z direction. It is especially noted that, at the positions of +90° and −90° with respect to the Z direction, the light intensity needs to be at least 25%, for example, of the center light intensity. For wall-mounting, emergent light from the light alarm 100 needs to satisfy the light intensity distribution curve as shown in FIG. 3A on the Y-Z plane as shown in FIG. 2, i.e., the light intensity needs to satisfy the curve of FIG. 3A in the range of −90° to 90° of the included angle with respect to the Z direction. Moreover, the emergent light from the light alarm 100 needs to further satisfy the distribution curve as shown in FIG. 3B on the X-Z plane, i.e., the light intensity needs to satisfy the light intensity distribution curve as shown in FIG. 3B in the range of 0° to 90° of the included angle with respect to the Z direction.

As described above, top-mounting and wall-mounting have different requirements of light intensity distribution. In order to satisfy different requirements for light intensity distribution, manufacturers generally design different light alarms for different mounting conditions.

SUMMARY

One embodiment provides a lens capable of transmitting divergent light from an optical source, comprising a lens body being substantially in the shape of a cap and having a substantially flat bottom surface; and a substantially cross-shaped recess sunken into the bottom surface, the recess providing orthogonal cross-arms, the optical source being adapted to be disposed in a cavity formed by the recess and capable of aligning with a crossing center of the cross-arms, and the recess being arranged so that more light incident upon an internal surface of the recess is refracted to the directions of the cross-arms than to the directions between the cross-arms.

In one embodiment, the cross-shaped recess also has a refraction element between every two adjacent cross-arms, each refraction element being arranged to refract the light incident upon the refraction element to the directions of the adjacent cross-arms.

In one embodiment, each of the refraction elements has two refracting sub-surfaces in mirror symmetry about a mirror plane, which is perpendicular to the bottom surface and extends along a axis between the two adjacent cross-arms.

In one embodiment, each of the refracting sub-surfaces has a profile tapering from the bottom surface to a top of the recess.

In one embodiment, an abutting edge between each of the refracting sub-surfaces and the bottom surface bends towards the geometric center of the bottom surface.

In one embodiment, each of the refracting sub-surfaces has an abutting edge between the refracting sub-surface and an adjacent cross-arm, and the abutting edge bends away from the geometric center of the bottom surface.

In one embodiment, each of the refracting sub-surfaces is a continuous curved surface formed by cone curves.

In one embodiment, the cross-arms have a foot part close to the bottom surface and configured to direct the light incident upon the foot part towards the bottom surface.

In one embodiment, the thickness of the lens increases when the distance from the bottom surface decreases along the cross-arms.

In one embodiment, the external surface of the lens body is substantially in the shape of any of a spherical cap, a truncated cone, and a flat-top spherical cap.

In one embodiment, the external surface of the lens body is a surface of revolution around an axis perpendicular to the bottom surface at the geometric center of the bottom surface.

In one embodiment, the external surface comprises at least two external sub-surfaces arranged one above another, each having a different incline angle, a different span and/or a different curvature from each other.

In one embodiment, the external surface and the internal surface of the recess are both formed by cone curves.

In one embodiment, the cone curve is an elliptic curve.

Another embodiment provides a light-emitting device, comprising a lens as disclosed above; an optical source positioned in a space surrounded by the recess of the lens; and a control circuit configured to turn on the optical source in response to a command.

Another embodiment provides a visual notification appliance, comprising a light-emitting device as disclosed above, wherein the optical source is any one of a single-chip LED, two or more discrete LEDs, an integrated LED array of multiple light-emitting chips, and a high-density integrated LED area light source.

BRIEF DESCRIPTION OF THE DRAWINGS

Example aspects and embodiments of the invention are described below with reference to the drawings, in which.

DETAILED DESCRIPTION

Figure 1:
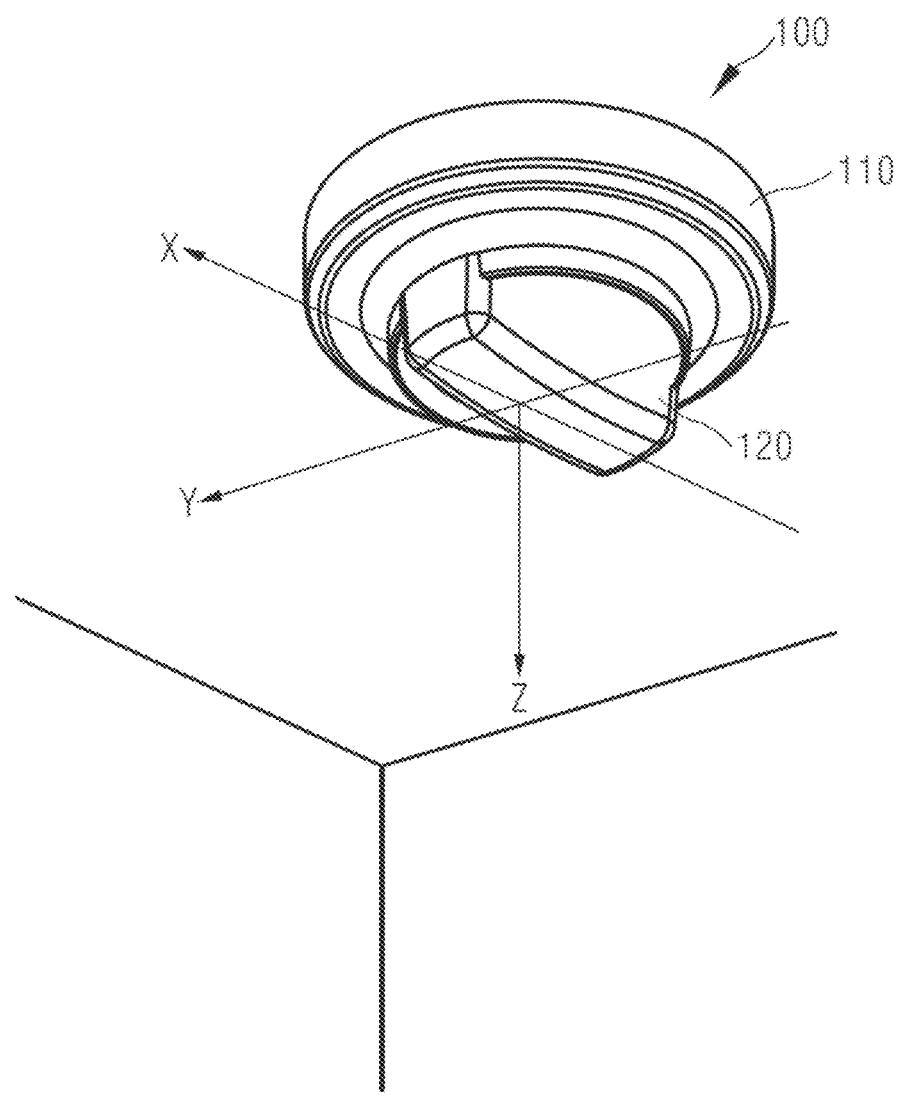
FIG. 1 schematically shows a schematic diagram of a light alarm mounted on a ceiling.

Embodiments of the present invention provide a lens, which enables the incident light beam having divergent characteristics from an optical source to refract, and the refracted emergent light can satisfy a predetermined optical distribution. Preferably, another object of the present invention is to provide a light-emitting device having the above lens, which can satisfy different requirements of light intensity distribution respectively in the wall-mounting and top-mounting cases.

Some embodiments provide a lens which can transmit divergent light from an optical source, comprising: a lens body substantially in the shape of a cap and having: a substantially flat bottom surface; a substantially cross-shaped recess sunken into the bottom surface, the recess providing orthogonal cross-arms, the optical source being adapted to be disposed in a cavity formed by the recess and capable of aligning with a crossing center of the cross-arms, and the recess being arranged so that more light incident upon an internal surface of the recess is refracted to the directions of the cross-arms than to the directions between the cross-arms. Preferably, the cross-shaped recess further has a refraction element between every two adjacent cross-arms, each refraction element being arranged to refract the light incident upon the refraction element to the directions of the adjacent cross-arms.

Here, since the lens bottom surface has a cross-shaped recess, rather than a recess with a smooth internal surface, the lens can particularly effectively refract the light in the direction between the cross-arms (non-cross light region). Using the above lens provided by the present invention can effectively improve the light intensity distribution of the divergent light from the optical source, so as to enhance the light intensity in a cross-shaped light region with the optical source as a center, which is exactly adapted to satisfy the requirements of visual notification appliances in some fire-protection standards. Moreover, since such a lens is used, the relevant requirements of light intensity distribution can be satisfied without choosing an optical source having a higher power. On the contrary, a person skilled in the art may select a relatively small and relatively inexpensive optical source, which greatly enlarges the range of choice of components and reduces costs.

In an embodiment, the refraction element between two adjacent cross-arms preferably has two refracting sub-surfaces in mirror symmetry about a mirror plane which is perpendicular to the bottom surface and extends along a axis of the two adjacent cross-arms. Preferably, each of the refracting sub-surfaces has a profile tapering from the bottom surface to a top of the recess. More preferably, an abutting edge between each of the refracting sub-surfaces and the bottom surface bends towards the geometric center of the bottom surface. More preferably, each of the refracting sub-surfaces has an abutting edge between the refracting sub-surface and an adjacent cross-arm, and the abutting edge bends away from the geometric center of the bottom surface.

Using the above lens provided by the present invention, the refraction element comprises refracting sub-surfaces which have a shape adapted to directing light to the cross-arms. Moreover, in particular, for the light incident upon the portion of the lens close to the bottom surface, owing to the curvature of the refracting surface, the incident light can be redirected more effectively, so as to effectively enhance the light intensity distribution in the cross light region.

In yet another embodiment, the cross-arms have a foot part close to the bottom surface and configured to direct the light incident upon the foot part towards the bottom surface. Preferably, the thickness of the lens increases when the distance from the bottom surface decreases on the cross-arms. Thus, the cross-arms likewise can enhance the light intensity of the cross light region, and especially have a strong light intensity enhancing effect for the portion having a large included angle (e.g., an angle greater than 40 degrees) with respect to the optical axis Z, and more particularly, have an obvious light intensity enhancing effect for the portion forming an angle from ±60-90 degrees with respect to the optical axis Z.

In yet another embodiment, the external surface of the lens is substantially in the shape of any of a spherical cap, a truncated cone and a flat-top spherical cap. Optionally, the external surface of the lens is a surface of revolution around an axis perpendicular to the bottom surface at the geometric center of the bottom surface. More preferably, the external surface comprises at least two external sub-surfaces arranged one above another, each having a different incline angle, a different span and/or a different curvature from each other.

Using the lens provided by the present invention as above, the external surface of the lens can be formed by stacking and connecting multiple surfaces of revolution. Thus, the lens can maximally redirect the incident light, so that the emergent light can satisfy the predetermined light intensity requirements, e.g., to achieve enhanced light intensity distribution in the cross light region.

In yet another embodiment, the external surface and the internal surface of the recess are both formed by cone curves.

Preferably, the cone curve is an elliptic curve. Using a surface formed by a cone curve as the lens surface can accurately direct the incident light and refract the incident light.

In an embodiment, the present invention provides a light-emitting device, comprising a lens as described above; an optical source arranged in a space surrounded by a recess of the lens; a control circuit configured to turn on the optical source in response to a command.

In an embodiment, the present invention further provides a visual notification appliance, comprising: a light-emitting device as described above; wherein the optical source is any one of a single-chip LED, an LED array (comprising multiple light-emitting PN junctions distributed in an array and integrated together), multiple discrete LED chips, and a high-density integrated LED area light source.

Such a visual notification appliance can not only satisfy the requirements of light intensity distribution in the relevant standards, but also make it possible to choose an optical source with a relatively low power on the premise of satisfying the requirements. Furthermore, such a visual notification appliance can also adapt to different mounting methods, such as top-mounting and wall-mounting, and can satisfy the requirements of light intensity distribution in the relevant standards in all the different mounting methods.

Preferred embodiments will be explained in a clear and comprehensible manner hereinafter with reference to the accompanying drawings, and the above characteristics, technical features, advantages and implementation of the light-emitting device will be further described.

For better understanding of the technical features, objects and effects of the present invention, the particular embodiments of the present invention will now be described herein with reference to the accompanying drawings, and the same numerals denote the components having the same or similar structure while having the same function throughout the drawings.

As used herein, the term "exemplary" means "serving as an example, instance, or description," and any "exemplary" illustration and embodiment herein should not be interpreted as a more preferred or a more advantageous technical solution.

For clarity of the drawings, only the relevant parts of the present invention are schematically shown throughout the drawings, and they do not represent the actual structure of a product. In addition, in order to make the drawings simple and easy to understand, only one of the components with the same structure or function in some of the drawings is schematically depicted, or only one is marked.

As used herein, "a/an" not only means only one", but can also mean more than one". In addition, as used herein, the terms "first" and "second" etc. are only used to distinguish one from another, rather than to stand for their degree of importance and order etc.

As used herein, the terms "upper, lower, left, right, front and rear" are used merely for convenience of description, rather than limiting the absolute positional relationship between the components, and they only represent the relative relationship between the components. For different mounting methods (e.g., top-mounting or wall-mounting), the absolute positional relationship of the components is changed, but the above relative position relationship remains unchanged.

Figure 2:
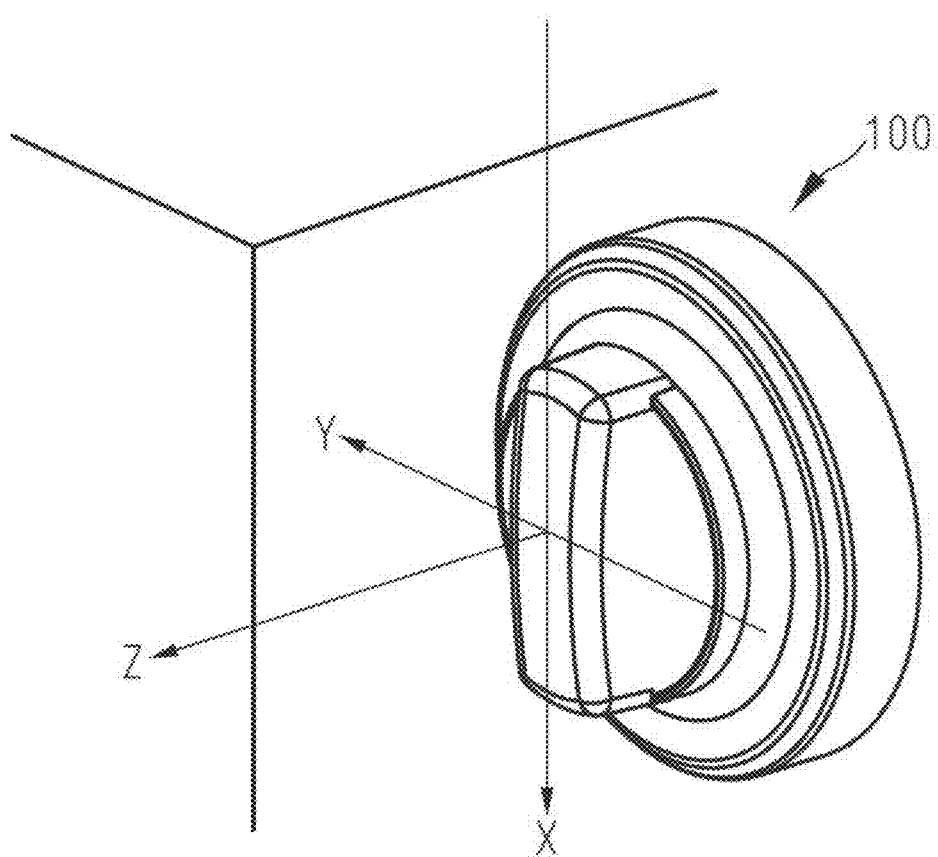
FIG. 2 schematically shows a schematic diagram of a light alarm mounted on a wall.
Figure 3A:
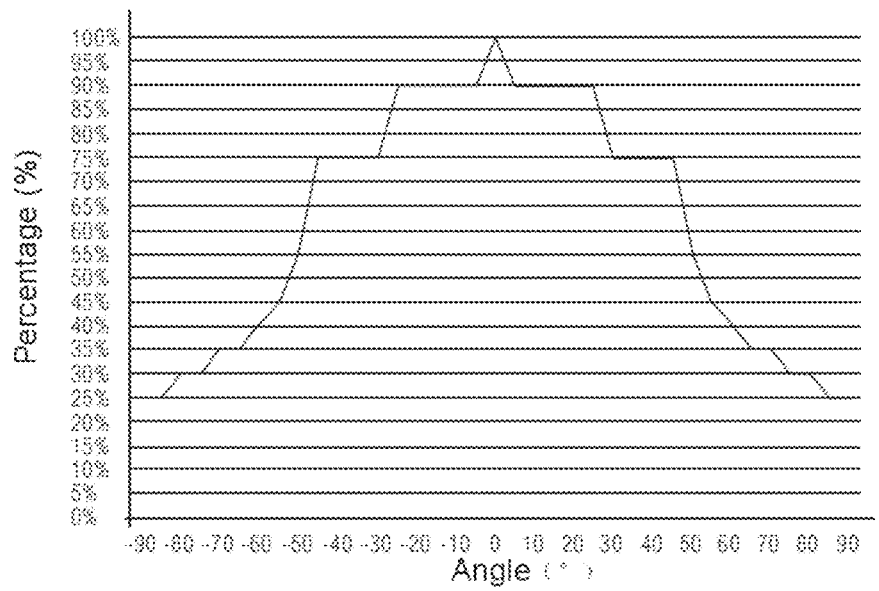
FIGS. 3A and 3B respectively schematically show the light intensity distribution requirements under "top-mounted" and "wall-mounted" conditions specified in a certain fire-protection standard.
Figure 3B:
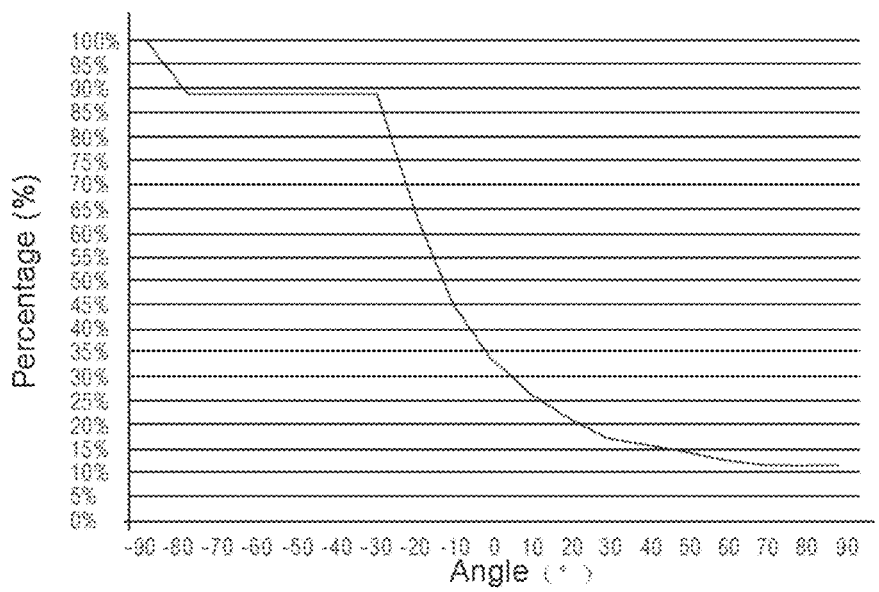
Figure 4:
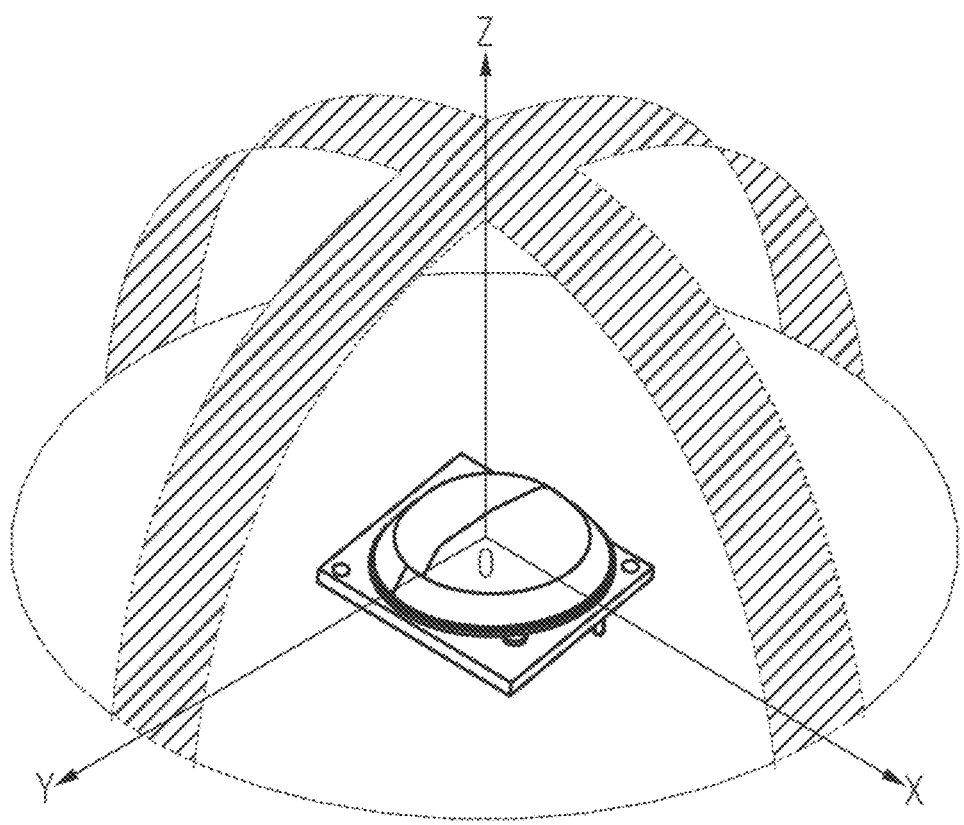
FIG. 4 schematically shows a schematic diagram of a light intensity distribution hemisphere in ideal conditions.

Generally, when a light-emitting device (e.g., a light alarm) is tested, the light intensity distribution of the emergent light from the light-emitting device will be measured at a predetermined distance (e.g., 3 meters) from the optical source center of the light-emitting device. For the light alarm as shown in FIGS. 1 and 2, the emergent light may form a light intensity distribution hemisphere at the predetermined distance. In the natural state (without any lens), in the light intensity distribution of the optical source, the light intensity becomes stronger when getting closer to the top of the light intensity distribution hemisphere (the position directly facing the center of the optical source); and the light intensity becomes weaker when getting closer to the edge portion of the hemisphere (at an angle of +90° to −90° with respect to the optical axis Z). If the optical power of the optical source is not increased, it is difficult to achieve the requirements of light intensity distribution as shown in FIGS. 3A and 3B. For this purpose, ideally, for example, the light-emitting device of the light alarm can enhance the light intensity distribution in the X and Y directions. FIG. 4 schematically shows an ideal light intensity distribution hemisphere, wherein the cross light region formed in the X and Y directions is the region in which the light intensity needs to be enhanced.

For this requirement, the inventor of the present invention provides that the light intensity distribution of the cross light region in FIG. 4 is enhanced by designing an appropriate lens. Here, the inventor indicates that an appropriate lens can be designed for the optical source, which lens can refract the incident light, which directs to a three-dimensional region between the X and Y directions in FIG. 4, to the cross light region.

Figure 5:
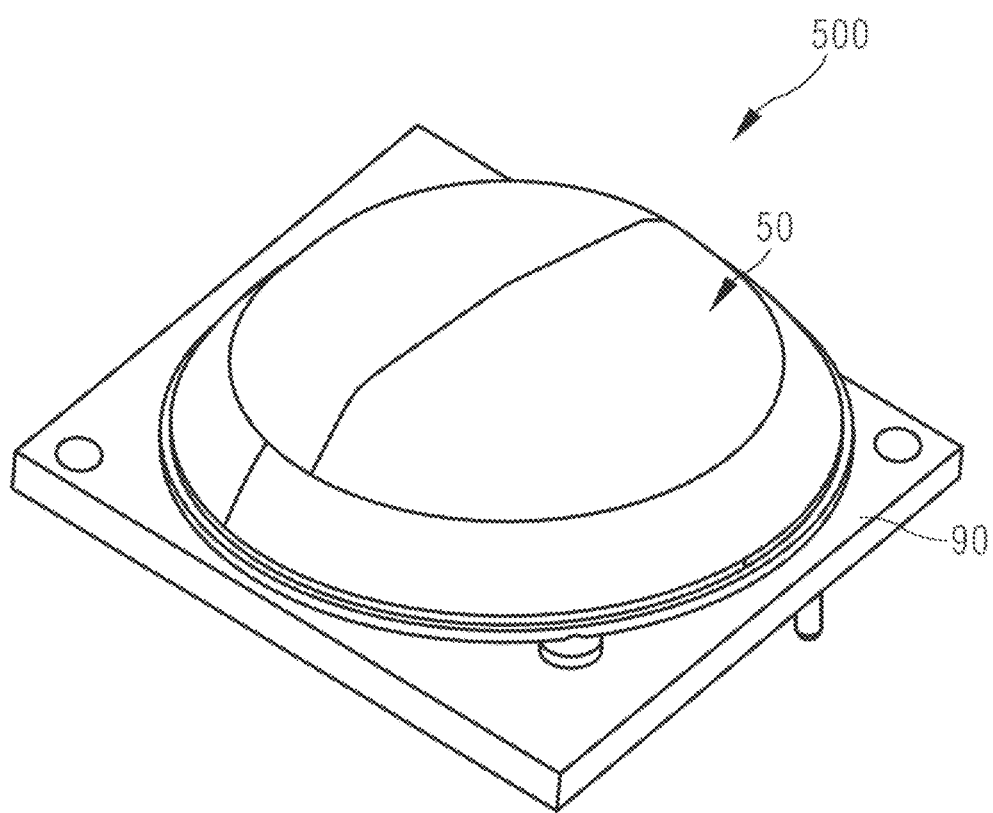
FIG. 5 shows a schematic diagram of a light-emitting device according to an embodiment of the present invention.
Figure 6:
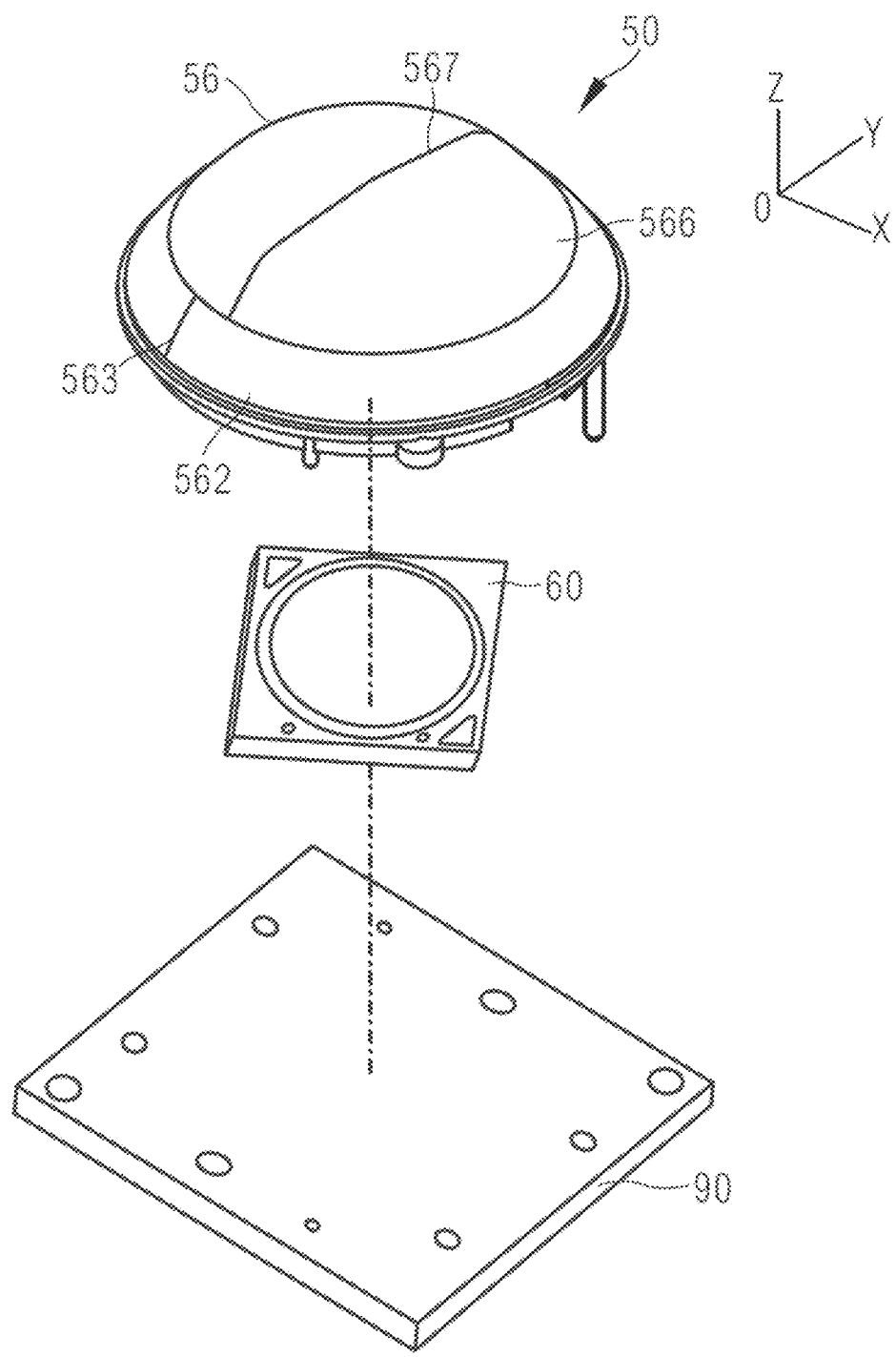
FIG. 6 shows an assembly diagram of a light-emitting device according to an embodiment of the present invention.

FIG. 5 shows a light-emitting device 500 according to an embodiment of the present invention, with the assembly diagram thereof shown in FIG. 6. As shown in FIGS. 5 and 6, the light-emitting device 500 comprises a substrate 90, an optical source 60 which can be disposed on the substrate 90, a lens 50 covering the optical source, and a control circuit (not shown) which can turn on the optical source 60 in response to a command (e.g., a warning command). The light-emitting device 500 may be a constituent part of a visual notification appliance, for example. The visual strobe notification appliance may also have other components, for example, a mounting base, an acoustic alarm module, etc.

The light-emitting device 500 may be mounted on a ceiling as shown in FIG. 1, or mounted on a wall as shown in FIG. 2. Regardless of top-mounting or wall-mounting, the substrate 90 can be considered as the mounting base in FIGS. 1 and 2 or a portion of the mounting base, and can be directly or indirectly fixed to a surface of a building. Both the optical source 60 and the lens 50 can be fixed to the substrate 90. The substrate 90 may also have a heat dissipation effect, for example, to avoid overheating of the optical source disposed thereon. In addition, in some cases, the substrate 90 itself may also be a printed circuit board, for example, with the above control circuit being formed thereon. In this case, the optical source 60 can be directly fixed to the circuit board where the control circuit is located.

The optical source 60 is preferably a light-emitting diode (LED). In FIG. 6, the optical source 60 is an area light source integrating tens to hundreds of LEDs at a high density. Optionally, the optical source 60 may also be a single high-power LED serving as a point light source, a combined optical source formed by two or more LEDs, or an LED element in other package forms. Regardless of which form the optical source takes, the optical source 60 may have a geometric center, an optical source center for short. For a single LED, its optical source center is the center of the single LED. For a combined optical source consisting of multiple LEDs, since it generally has a symmetrical structure, the optical source center is the geometric center of the arrangement of the multiple LEDs. For the high-density integrated area light source as shown in FIG. 6, the optical source center is the geometric center of the area light source. Likewise, regardless of which form the optical source takes, it is considered herein as an optical source capable of emitting divergent light.

The lens 50 in FIGS. 5 and 6 is an integrally formed lens body, and can cover the optical source 60. In other words, the optical source 60 can be disposed within the range of the edge of the lens 50. The lens 50 is shaped to enable the incident light from the optical source 60 to be redirected, and enable the emergent light from the lens 50 to always satisfy a predetermined light intensity distribution (e.g., the requirements of light intensity distribution as shown in FIGS. 3A and 3B). The lens 50 is preferably integrally formed using a transparent material which may be, for example, an optical polycarbonate (PC) or an organic glass light-transmitting material.

Figure 7:
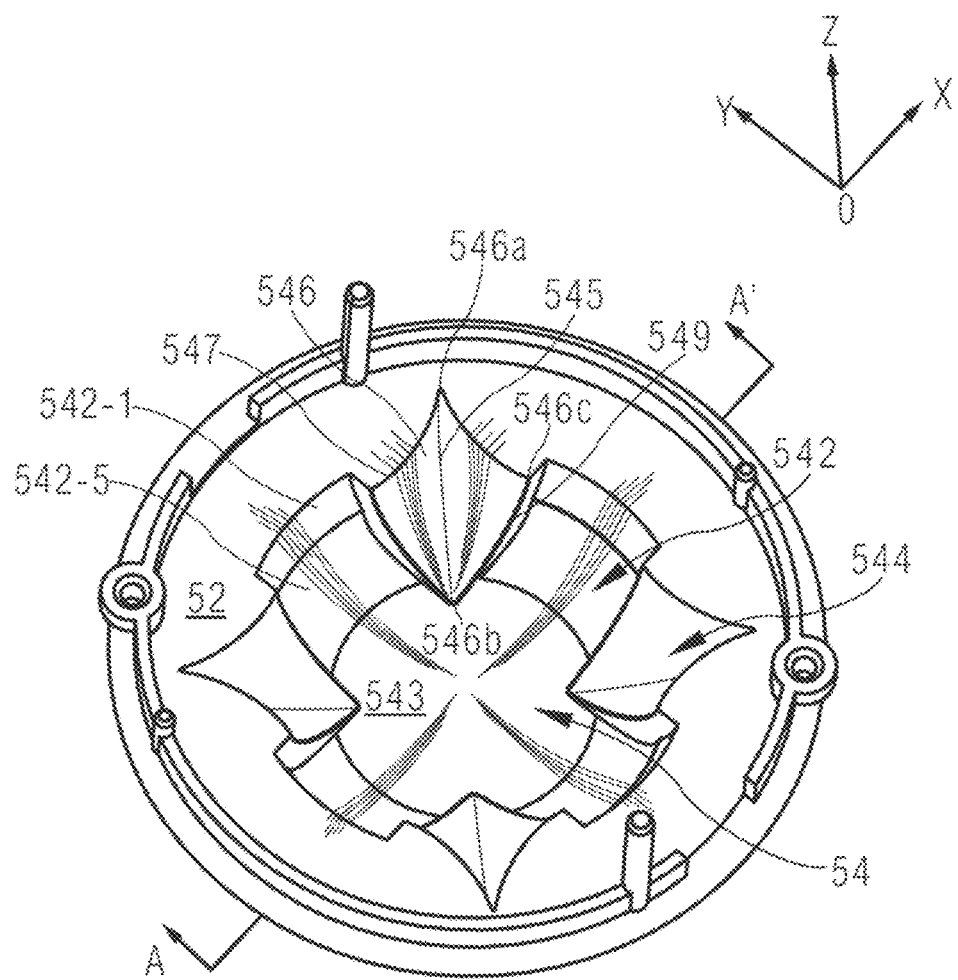
FIG. 7 shows a bottom surface view of a lens according to an embodiment of the present invention.
Figure 8:
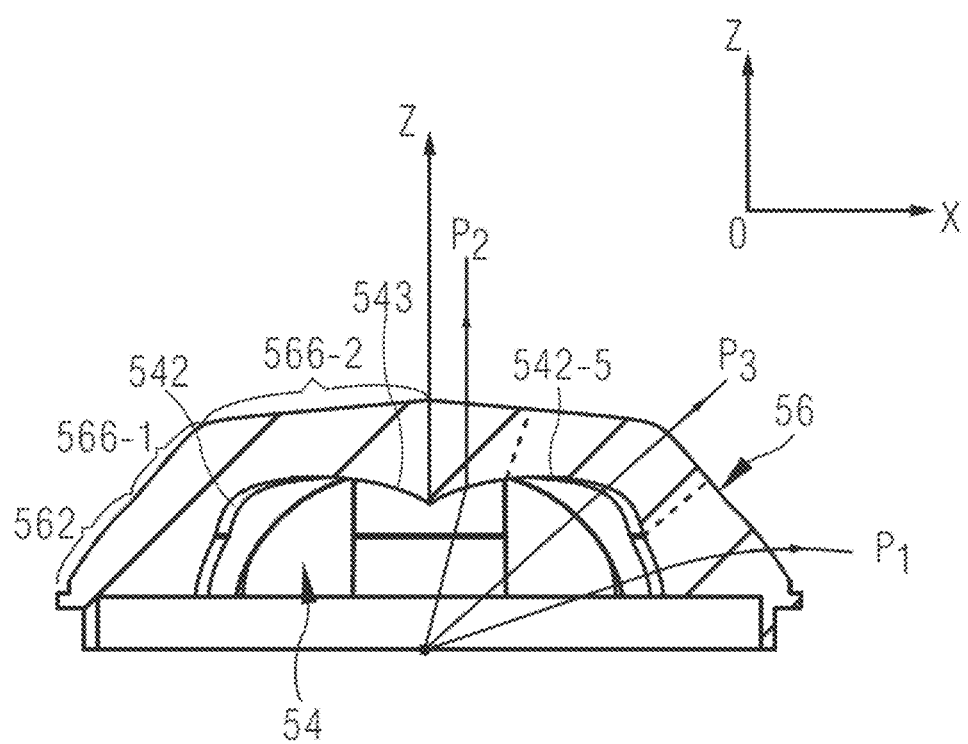
FIG. 8 shows a sectional view of a lens according to an embodiment of the present invention along a line A-A' as shown in FIG. 7.
Figure 9:
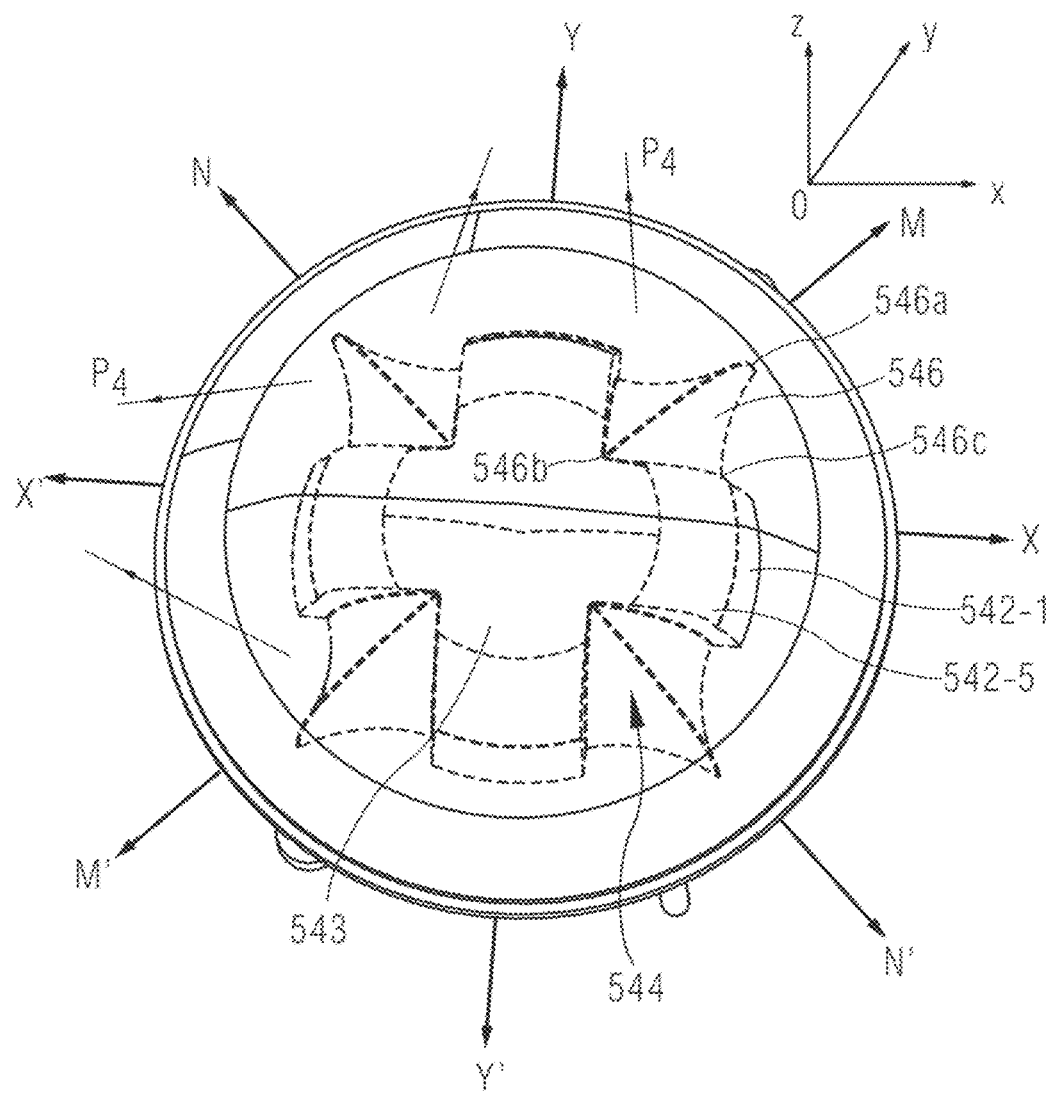
FIG. 9 shows a top view of the lens according to an embodiment of the present invention.

FIG. 7 shows a bottom view of the lens 50, showing a structure of the bottom surface of the lens 50. FIG. 8 shows a sectional view of the lens 50 along the direction A-A' in FIG. 7. FIG. 9 schematically shows a top view of the lens 50, in which the structure on the bottom surface of the lens is shown with dotted lines. The specific structure of the lens 50 in the embodiment will be described in detail in conjunction with FIGS. 5-9.

As shown in FIGS. 5 to 9, the lens 50 is generally in the shape of a cap. The lens 50 has a substantially flat bottom surface 52, an optical axis Z perpendicular to a bottom surface 52 at the geometric center of the bottom surface, and an external surface 56 protruding in the direction of optical axis Z. The bottom surface 52 may be disposed or fixed to the substrate 90. As shown in FIGS. 7-9, the bottom surface 52 has a recess 54 sunken into the lens in the direction of optical axis Z. The space surrounded by the recess 54 forms a cavity capable of accommodating the optical source 60. Preferably, the optical source 60 is arranged so that its optical source center coincides with the geometric center of the bottom surface. The optical source 60 may have a light-emitting surface, and more preferably, the normal direction of the light-emitting surface coincides with the optical axis Z of the lens 50. Optionally, the light-emitting surface of the optical source 50 may be slightly lower or slightly higher than the bottom surface 52 of the lens 50.

As shown in FIGS. 7-9, for the lens 50, the internal surface of the recess 54 receives the incident light from the optical source 60, which forms a first refraction border. The light refracted by the lens is emergent from the external surface 56, and the external surface 56 forms a second refraction border. The lens defined by the first and second refraction borders enables the transmitted light to be redirected to finally achieve the desired light intensity distribution of the emergent light. As shown in FIGS. 7-9, the first and second refraction borders are not regular curved surfaces, and are each formed by multiple curved surfaces connected to each other. The first and second refraction borders corresponding to each other inside and outside each of the curved surfaces constitute a small lens portion. The small lens portions have different refracting effects on light. For simplicity, the names of the curved surfaces formed on the internal surface of the recess 54 are used to refer to the corresponding lens portions.

As shown in FIGS. 5 and 6, the external surface 56 of the lens 50 is a continuous smooth surface, and appears in the shape of a substantially truncated cone. FIG. 8 shows a sectional profile of the external surface 56 along the line A-A' in FIG. 7. The external surface 56 of the lens is preferably a surface of revolution which may be formed by a control line of a predetermined shape rotating around the optical axis Z. In FIG. 8, the left half profile curve of the external surface 56 may be considered as a control line of the surface of revolution. The control line (also represented by 56 herein) may have various shapes according to the actual situations. For example, the control line 56 may be any one of cone curves, for example, a circle, a hyperbola, an ellipse and a parabola. In the example of FIG. 8, the control line of the external surface 56 is a part of an ellipse.

More preferably, as shown in FIGS. 5 and 6, the external surface 56 may further comprise two external sub-surfaces 562 and 566 arranged one above the other in the direction of optical axis Z. Transition lines 563 and 567 as shown in FIGS. 5 and 6 may be considered to be control lines for forming the two surfaces of revolution 562 and 566, respectively. More preferably, the external sub-surface 566 may further comprise two sub-surfaces arranged one above the other. The control lines, 566-1 and 566-2, respectively, for the sub-surfaces are shown in FIG. 8. According to requirements, the external surface 56 may further comprise more than three external sub-surfaces arranged one above another. Different external sub-surfaces may be different from each other in inclination, radius of curvature and span. In the example as shown in FIG. 8, the curvature of the control lines 563 and 566-1 is significantly greater than that of the control line 566-2. The surface of revolution of different shapes and trends can be obtained by changing the initial point, final point, curvature and other factors of the control line for forming the surface of revolution. A person skilled in the art could adjust and finally obtain the desired shape of the external surface 56 of the lens according to the actual situation.

The example of FIGS. 5-8 focuses on showing that the external surface 56 is a surface of revolution formed by a cone curve (preferably an elliptic curve). In practical applications, for the purpose of simplification, the external surface 56 may also use a relatively simple cone curve (e.g., a circle or a straight line), so as to form a spherical surface, a conical surface, etc., for example. Thus, the shape of the external surface 56 may also substantially be any one of a spherical cap, a flat-top spherical cap or a truncated cone, for example.

The internal surface of the recess 54 will be described below with reference to FIGS. 7-9. As shown in FIG. 7, the recess 54 is sunken inwardly from the bottom surface 52 (inwardly in the direction of optical axis Z) and has a substantially cross shape. Such recess 54 provides orthogonal cross-arms 542 and has a crossing center 543. The sunken cross-arms 542 provide a substantially arched cavity.

The optical source 60 may be arranged right below the crossing center of the cross-arms 542, and the optical source center of the optical source 60 is concentrically aligned with the crossing center. The recess 54 having cross-arms is arranged so that more light incident upon its internal surface is refracted to the directions (X-X' or Y-Y' as shown in FIG. 9) of cross-arms 542 than to the directions (e.g., M-M' or N-N' as shown in FIG. 9) between adjacent cross-arms.

Specifically, as shown in FIGS. 7 and 9, the recess 54 further has refraction elements 544 each arranged between every two adjacent cross-arms 542. As shown in the figure, the recess 54 has four refraction elements 544 symmetrical to each other, only one of which is indicated with reference signs in the figure. Each refraction element 544 is arranged to refract the light incident thereupon to the directions (X-X' or Y-Y' as shown in FIG. 9) of the adjacent cross-arms 542. FIG. 9 shows the light, which is incident from the refraction element 544 on the internal surface of the recess 54, emergent from the corresponding external surface. It can be seen from FIG. 9 that the refraction element 544 functions to refract the divergent light from the optical source to the directions of the cross-arms. Thus, using the refraction element 544, the light intensity of the emergent light is enhanced in a cross region on the light intensity distribution hemisphere after the divergent light from the optical source is refracted by the lens 50, the projection of the cross region on the lens being of a cross shape extending in the direction X-X' or Y-Y', i.e., the direction of cross-arms. Also owing to the refraction element 544, the recess 54 represents a substantially cross-shaped recess.

In the embodiment as shown in FIGS. 7 and 9, each refraction element 544 may comprise two refracting sub-surfaces 546 in mirror symmetry to each other, for example. The two refracting sub-surfaces 546 are in mirror symmetry about a mirror plane which is perpendicular to the bottom surface 52 and extends along a middle axis (e.g., M-M' or N-N' as shown in FIG. 9) between the two adjacent cross-arms, for example. In this embodiment, the abutting border 545 of the two refracting sub-surfaces 546 may extend inwardly from an initial point 546a on the bottom surface 52 to a final point 546b on the top of the recess 54. Preferably, the final point 546b may be a connecting point between two adjacent cross-arms 542, as shown in FIGS. 7 and 9. Obviously, the abutting border 545 extends in the mirror plane. Optionally, the abutting border may also stop at a position at a certain distance from the connecting point between the two cross-arms.

As shown in FIG. 7, each refracting sub-surface 546 extends inwardly from the bottom surface 52 and has a tapering profile, and preferably, the profile is reduced to zero at the final point 546b. Thus, in FIG. 7, each refracting sub-surface 546 shows the shape of a substantially inverted triangle. The abutting border 547 between each refracting sub-surface 546 and the bottom surface 52 is a curve starting from the initial point 546a of the abutting border 545 and ending at the connecting point 546c of the adjacent cross-arm. The abutting border 547 bends towards the geometric center (optical axis Z) of the bottom surface 52. The abutting border 549 between each refracting sub-surface 546 and its adjacent cross-arm 542 bends away from the geometric center (optical axis Z) of the bottom surface 52. As shown in FIGS. 7 and 9, each refracting sub-surface 546 is a continuous curved surface. Preferably, the curved surface of the refracting sub-surface 546 is formed by a cone curve. For example, assuming that the refracting sub-surface 546 has the shape like an inverted triangle as shown in FIG. 7, the desired refracting sub-surface 546 can be obtained by adjusting positions of three end points (546a, 546b and 546c) of the refracting sub-surface 546 and the curvature of the abutting border (545, 547 and 549) between every two adjacent end points. After determining the end points and the abutting borders, a smooth curved surface is generated. Preferably, each of the abutting borders 545, 547 and 549 is a cone curve, and more preferably, the cone curve is an elliptic curve.

FIGS. 7 and 9 merely exemplarily show an embodiment of the refraction element 544. According to the content disclosed in FIGS. 7 and 9, a person skilled in the art would conceive of other various alternatives. For example, the refraction element 544 may further have more than two refracting sub-surfaces abutting with each other, each of which may have the shape like a quadrangle, like a triangle or like another suitable geometrical shape, for example. The bending directions and curvatures of the refracting sub-surfaces may be adjusted according to requirements. Furthermore, the refracting sub-surfaces are not necessarily in mirror symmetry, and may change continuously or may be arranged one above another. Furthermore, if the space on the bottom surface 52 of the lens allows, the refracting sub-surface 546 with a larger span may be provided to enlarge the refracting surface and accordingly redirect more light to the desired direction so as to maximally refract the light close to the bottom of the lens 50 to the direction X-X' or Y-Y'. Also for example, different from that in FIG. 7, the refracting sub-surface 546 may optionally be smoothly connected to the adjacent cross-arm without any step formed. Furthermore, the refracting sub-surface may also have the shape of a quadrangle or a polygon with more than four sides.

FIG. 8 shows a sectional view of the lens 50 along the line A-A' as shown in FIG. 7, i.e., along the center line of the two diagonally arranged cross-arms. As shown in FIG. 8, the cross-arm 542 and the corresponding portion on the external surface 56 respectively constitute an upper and a lower refraction border of the lens portion indicated by oblique lines in FIG. 8. The divergent light from the optical source is incident upon the cross-arms 542 on the internal surface, is refracted by the lens, and is emergent from the external surface 56. In general, the cross-arm 542 may adjust the light intensity distribution of the emergent light by means of refraction to enhance the light intensity at positions at +90 degrees and −90 degrees with respect to the optical axis Z.

Specifically, as shown in FIGS. 7-9, the cross-arm 542 may be further divided into a foot part 542-1 and a shoulder part 542-5. The central portion of the cross-arm 542 is known as a crossing center 543. The foot part 542-1 is close to the bottom surface 52, and the thickness of the lens increases when the distance between the foot part 542-1 and the bottom surface decreases. FIG. 8 shows a light path P1 incident upon the foot part 542-1. As shown in FIG. 8, the light incident on the foot part 542-1, after being refracted by the lens portion of the foot part, is refracted to the direction of the bottom surface. The crossing center 543 is located at the top of the recess 54, and the thickness of the lens increases when the distance between corresponding lens portion and the crossing center decreases, so as to form a tip protruding toward the bottom surface at the position of the crossing center point. The tip is aligned with the optical axis. The light incident upon the crossing center 543 is redirected to the direction of the optical axis Z, as shown in a light path P2. The redirecting effect of light by the shoulder part 542-5 is to ensure a certain light intensity distribution at the position at 45 degrees with respect to the Z axis, as shown in a light path P3. In the example of FIG. 8, all the internal surfaces of the cross-arms 542 are surfaces formed by cone curves. A person skilled in the art would appreciate that the shape and trend of the curved surface can be adjusted by determining the initial point and the final point of the control line of the cone curve and accordingly adjusting the curvature of the control line. It can be seen from the content shown in FIG. 8 that the cross-arms 542 may also enhance the light intensity of the cross light region as shown in FIG. 4.

Figure 10:
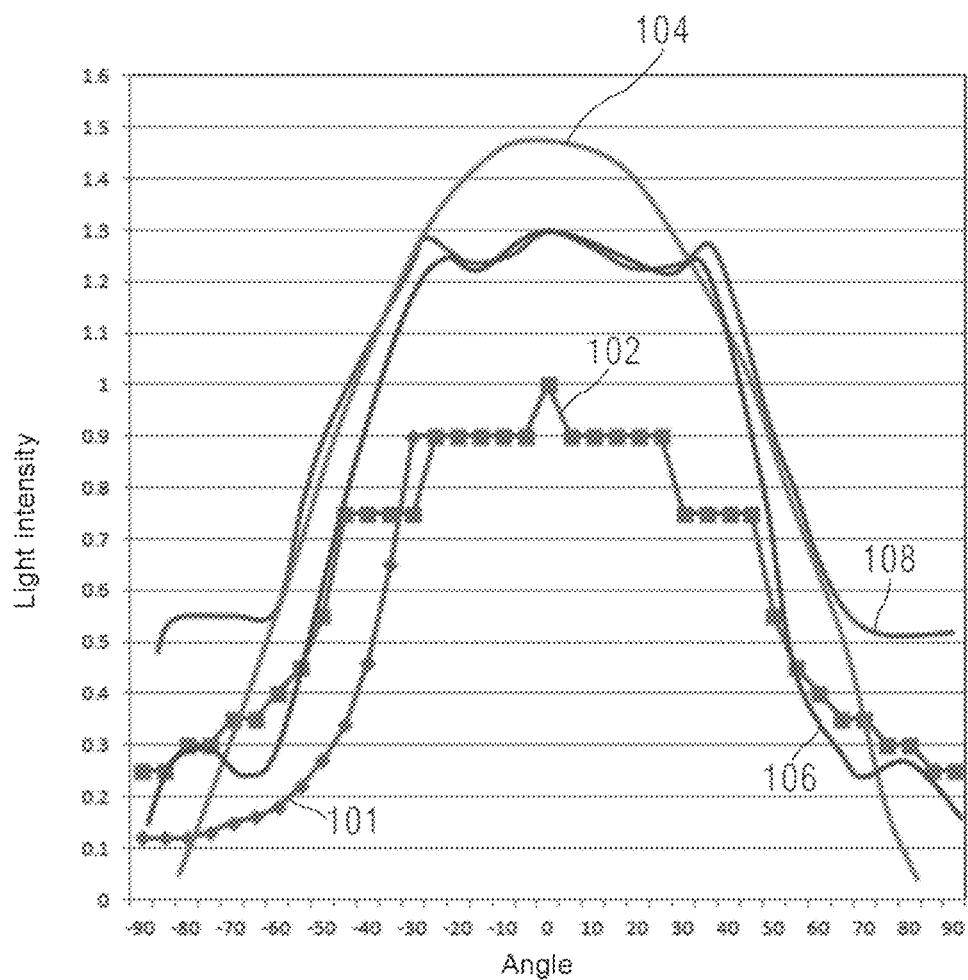
FIG. 10 shows a light intensity distribution curve after using the lens in the embodiment of the present invention.

FIG. 10 exemplarily shows a curve of the light intensity distribution hemisphere measured in various conditions. In FIG. 10, curves 101 and 102 identify the light intensity distribution required in the standards. The curve 104 identifies the light intensity distribution of the divergent light beam of the optical source itself without a lens. It can be seen from the figure that the light intensity distribution curve 104 of a common LED optical source cannot meet the standards. In order to meet the standards, the power of the LED needs to be significantly increased, so as to enable the entire light intensity distribution curve 104 to be higher than the requirement in the standards. However, this will result in excessively high light intensity at the center of the LED and cause a waste. The curve 106 identifies a light intensity distribution in an intermediate case, and in this case, the internal surface of the recess of the lens is a surface of revolution which has a cross section as shown in FIG. 8. In other words, in the case identified by the curve 106, the recess does not have a cross shape. It can be seen from the figure that the light intensity distribution of the curve 106 is adjusted with respect to the curve 104, but the light intensity at the position in a range of angle of +/−90 degrees still cannot achieve the standard requirements. The curve 108 is a light intensity distribution diagram of an optical source covered by the lens 50 as shown in FIGS. 5-9. It can be seen from the curve 108 that the lens 50 provided by the present invention may greatly enhance the light intensity distribution at positions at +/−90 degrees with respect to the optical axis Z. Thus, using the lens provided by the present invention can utilize the power of the LED optical source more effectively, and therefore LEDs with a relatively low power may also be chosen, which further reduces costs of the light-emitting device. Furthermore, the lens and the light-emitting device having the lens provided by the present invention may be used in both wall-mounting and top-mounting cases, and ensure that the requirement of standards as shown in FIGS. 3A and 3B under the two mounting manners are satisfied.

It should be understood that, although the description is given according to the embodiments, each embodiment does not comprise only one independent technical solution; this narrative manner of the description is only for clarity, and for a person skilled in the art, the description shall be regarded as a whole, and the technical solution in the embodiments can also be properly combined to form other implementations that can be understood by a person skilled in the art.

The series of detailed descriptions set forth above is merely directed to specific descriptions of feasible embodiments of the present invention, and they are not intended to limit the scope of protection of the present invention; any equivalent embodiment or alteration of the present invention, such as a combination, removal or duplication of features made without departing from the technical spirit of the present invention, shall be included within the scope of protection of the present invention.

What is claimed is:

1. A lens for transmitting divergent light from an optical source, the lens comprising:
   a lens body having a shape of a cap and having:
   a substantially flat bottom surface;
   a cross-shaped recess extending from the substantially flat bottom surface, the recess defining a cavity configured to receive the optical source and including orthogonal cross-arms that physically align the optical source received in the cavity, and
   a refraction element disposed between each pair of adjacent cross-arms, wherein each refraction element refracts light incident upon the refraction element along directions aligned with the respective pair of adjacent cross-arms;
   wherein the recess is configured such that for light incident upon an internal surface of the recess, more of the incident light is refracted in directions aligned with the orthogonal cross-arms than in directions extending between the orthogonal cross-arms.

2. The lens of claim 1, wherein the refraction element between each respective pair of adjacent cross-arms includes two refracting sub-surfaces oriented in mirror symmetry about a mirror plane that is perpendicular to the bottom surface and extends along an axis extending between the respective pair of adjacent cross-arms.

3. The lens of claim 2, wherein each refracting sub-surface has a profile that tapers from the bottom surface to a top of the recess.

4. The lens of claim 2, wherein an abutting edge between each of the refracting sub-surfaces and the bottom surface of the lens body curves towards a geometric center of the bottom surface.

5. The lens of claim 2, wherein each of the refracting sub-surfaces has an abutting edge between the refracting sub-surface and an adjacent cross-arm, and the abutting edge curves away from a geometric center of the bottom surface.

6. The lens of claim 2, wherein each of the refracting sub-surfaces is a continuous curved surface defined by curves of conic sections.

7. The lens of claim 1, wherein the cross-arms have a foot portion proximate the bottom surface of the lens body and configured to direct light incident upon the foot portion towards the bottom surface.

8. The lens of claim 1, wherein in a portion of the recess proximate the bottom surface of the lens body, a thickness of the lens body increases along a direction of each cross-arm toward the bottom surface.

9. The lens of claim 1, wherein an external surface of the lens body has a shape of a spherical cap, a truncated cone, or a flat-top spherical cap.

10. The lens of claim 1, wherein an external surface of the lens body is defined by a surface of revolution around an axis perpendicular to the bottom surface at a geometric center of the bottom surface.

11. The lens of claim 9, wherein the external surface comprises at least two external sub-surfaces arranged one above another, wherein the at least two external sub-surfaces have at least one of different incline angles, different spans, or different curvatures from each other.

12. The lens of claim 1, wherein each of an external surface of the recess and an internal surface of the recess are formed by curves defined by conic sections.

13. The lens of claim 12, wherein the curves defined by conic sections comprise elliptical curves.

14. A light-emitting device, comprising:
a lens configured to transmit divergent light from an optical source, the lens comprising a lens body having a shape of a cap and having:
a substantially flat bottom surface; and
a cross-shaped recess extending from the substantially flat bottom surface, the recess defining a cavity configured to receive the optical source and including orthogonal cross-arms that physically align the optical source received in the cavity,
wherein the recess is configured such that for light incident upon an internal surface of the recess, more of the incident light is refracted in directions aligned with the orthogonal cross-arms than in directions extending between the orthogonal cross-arms;
a refraction element disposed between each pair of adjacent cross-arms, wherein each refraction element refracts light incident upon the refraction element along directions aligned with the respective pair of adjacent cross-arms;
an optical source positioned in a space surrounded by the recess of the lens; and
a control circuit configured to turn on the optical source in response to a command.

15. A visual notification appliance, comprising:
a light-emitting device comprising:
a lens configured to transmit divergent light from an optical source, the lens comprising a lens body having a shape of a cap and having:
a substantially flat bottom surface;
a cross-shaped recess extending from the substantially flat bottom surface, the recess defining a cavity configured to receive the optical source and including orthogonal cross-arms that physically align the optical source received in the cavity,
a refraction element disposed between each pair of adjacent cross-arms, wherein each refraction element refracts light incident upon the refraction element along directions aligned with the respective pair of adjacent cross-arms,
wherein the recess is configured such that for light incident upon an internal surface of the recess, more of the incident light is refracted in directions aligned with the orthogonal cross-arms than in directions extending between the orthogonal cross-arms;
an optical source positioned in a space surrounded by the recess of the lens; and
a control circuit configured to turn on the optical source in response to a command;
wherein the optical source is selected from the group consisting of a single-chip LED, two or more discrete LEDs, an integrated LED array of multiple light-emitting chips, and a high-density integrated LED area light source.

* * * * *